(12) United States Patent
Jin et al.

(10) Patent No.: US 12,293,113 B2
(45) Date of Patent: May 6, 2025

(54) METHOD FOR STORING AND READING CACHED DATA AND DEVICE

(71) Applicant: YUSUR Technology Co., Ltd., Beijing (CN)

(72) Inventors: Jian Jin, Beijing (CN); Shuanglin Zhang, Beijing (CN)

(73) Assignee: YUSUR Technology Co., Ltd., Beijing (CN)

( * ) Notice: Subject to any disclaimer, the term of this patent is extended or adjusted under 35 U.S.C. 154(b) by 0 days.

(21) Appl. No.: 18/584,243

(22) Filed: Feb. 22, 2024

(65) Prior Publication Data
US 2024/0289055 A1  Aug. 29, 2024

(30) Foreign Application Priority Data
Feb. 28, 2023 (CN) .......................... 202310193368.3

(51) Int. Cl.
*G06F 3/06* (2006.01)

(52) U.S. Cl.
CPC .......... *G06F 3/0659* (2013.01); *G06F 3/0613* (2013.01); *G06F 3/0656* (2013.01); *G06F 3/0673* (2013.01)

(58) Field of Classification Search
CPC .... G06F 3/0659; G06F 3/0613; G06F 3/0656; G06F 3/0673
See application file for complete search history.

(56) References Cited

U.S. PATENT DOCUMENTS

| | | | |
|---|---|---|---|
| 2002/0174291 A1* | 11/2002 | Hsu | G11C 7/106 |
| | | | 711/E12.041 |
| 2007/0121499 A1 | 5/2007 | Pal et al. | |
| 2018/0011711 A1 | 1/2018 | Ray et al. | |
| 2022/0391321 A1 | 12/2022 | Sankaranarayanan et al. | |

FOREIGN PATENT DOCUMENTS

CN  112269747 A  1/2021

OTHER PUBLICATIONS

Search report of patent family EP24160176.4 issued by EPO on Jun. 6, 2024.

* cited by examiner

*Primary Examiner* — Jae U Yu
(74) *Attorney, Agent, or Firm* — Bayramoglu Law Offices LLC

(57) ABSTRACT

A method for storing and reading cached data and a device are provided. The method for storing and reading cached data includes: in response to receiving to-be-cached data, segmenting the to-be-cached data sequentially into at least two pieces of first fragmented data; writing the first fragmented data sequentially into first storage particles of at least two storage blocks in a time division multiplexing manner, and ensuring that the first fragmented data written into the respective first storage particles are different from each other. The fragmented data are stored and read in the time division multiplexing manner, and the fragmented data corresponding to a complete data are stored in different storage blocks, so a plurality of data can be stored and read in a complete data storage and read process, thereby reducing read and write time overhead during the execution of a large number of buffered data storage and read tasks.

15 Claims, 10 Drawing Sheets

---

In response to receiving to-be-cached data, segment the to-be-cached data sequentially into at least two pieces of first fragmented data — S110

Write the first fragmented data sequentially into first storage particles of the at least two storage blocks in a time division multiplexing manner — S120

Save a correspondance between first identifiers of the to-be-cached data and addresses of the first storage particles to a resource management table — S130

| In response to receiving a plurality of groups of to-be-cached data, segment each group of to-be-cached data sequentially into at least two pieces of first fragmented data | ⟋S210 |

↓

| Write the first fragmented data corresponding to each group of to-be-cached data simultaneously into first storage particles of the at least two storage blocks in a time division multiplexing manner, where the storage blocks corresponding to the respective first fragmented data being written at the same time are different from each other | ⟋S220 |

↓

| Save a correspondance between first identifiers of the to-be-cached data and addresses of the first storage particles to a resource management table | ⟋S230 |

FIG. 5

METHOD FOR STORING AND READING CACHED DATA AND DEVICE

CROSS REFERENCE TO RELATED APPLICATIONS

The present disclosure claims priority to Chinese Application No. 202310193368.3 filed on Feb. 28, 2023, and entitled "METHOD AND APPARATUS FOR STORING AND READING CACHED DATA, DEVICE, AND MEDIUM", all of which is incorporated herein by reference in its entirety.

TECHNICAL FIELD

The present disclosure relates to the field of data processing, and specifically to a method and apparatus for reading cached data and a device.

BACKGROUND

At present, computing devices generally use multi-threaded processors to improve data processing capabilities and achieve data input and output of large data traffic by concurrent execution of computing tasks. However, memories currently used by the multi-threaded processors still have conventional data caching architectures, which read and write data in whole frames and allocate data based on a single cache space. When cached data are read and written under the foregoing data caching architecture, if a plurality of threads concurrently perform read and write tasks of cached data, the read and write tasks corresponding to some threads need to queue up, which increases data read and write time overhead and reduces effective utilization of a processor.

SUMMARY

To solve the foregoing technical problems, embodiments of the present disclosure provide a method and apparatus for storing and reading cached data, a device, and a medium.

In a first aspect, an embodiment of the present disclosure provides a method for storing and reading cached data, the method is applied to a computing device, the computing device includes a buffer storage area, the buffer storage area includes at least two storage blocks, and each of the storage blocks has an independent address bus and data bus and a plurality of storage particles; and the method includes:
  in response to receiving to-be-cached data, segmenting the to-be-cached data sequentially into at least two pieces of first fragmented data;
  writing the first fragmented data sequentially into first storage particles of the at least two storage blocks in a time division multiplexing manner, and ensuring that the first fragmented data written into the respective first storage particles are different from each other; and
  saving a correspondence between first identifiers of the to-be-cached data and addresses of the first storage particles to a resource management table.

Optionally, a number of the to-be-cached data is a plurality of groups, and the number of the groups of the to-be-cached data is less than or equal to that of the storage blocks;
  the segmenting the to-be-cached data sequentially into at least two pieces of first fragmented data includes:
    segmenting each group of the to-be-cached data sequentially into at least two pieces of first fragmented data; and
  the writing the first fragmented data sequentially into first storage particles of the at least two storage blocks in a time division multiplexing manner includes:
    writing the first fragmented data corresponding to each group of the to-be-cached data simultaneously into the first storage particles of the at least two storage blocks in a time division multiplexing manner, where the storage blocks corresponding to the respective first fragmented data being written at the same time are different from each other.

Optionally, the first fragmented data corresponding to each group of the to-be-cached data are simultaneously written in a round robin fashion into the first storage particles of the at least two storage blocks in a time division multiplexing manner, until all the first fragmented data are written into the buffer storage area.

Optionally, a storage capacity of storage particles in each storage block is the same; and
  the segmenting the to-be-cached data sequentially into at least two pieces of first fragmented data includes:
    segmenting the to-be-cached data sequentially into the at least two pieces of first fragmented data according to the storage capacity of storage particles.

Optionally, the method further includes: in response to obtaining a buffered data read-out instruction, extracting a second identifier from the buffered data read-out instruction, the second identifier being an identifier of to-be-output data, where a sum of groups of the to-be-output data and the to-be-buffered data is less than or equal to the number of the storage blocks;
  querying a resource management table according to the second identifier to sequentially obtain addresses of at least two second storage particles associated with the to-be-output data, the second storage particles being distributed in the at least two storage blocks;
  when writing the first fragmented data sequentially into first storage particles of the at least two storage blocks in a time division multiplexing manner, the method further includes:
  reading out second fragmented data from the at least two storage blocks according to the addresses of the second storage particles in a time division multiplexing manner, where the storage block corresponding to each first fragmented data being written and the storage block corresponding to each second fragmented data being read out at the same time are different from each other; and
  splicing the second fragmented data that are read out until the to-be-output data are obtained.

In a second aspect, an embodiment of the present disclosure provides a method for storing and reading cached data, the method is applied to a computing device, the computing device includes a buffer storage area, the buffer storage area includes at least two storage blocks, each of the storage blocks has a plurality of storage particles and an independent system bus; and the method includes:
  in response to obtaining a buffered data read-out instruction, extracting a second identifier from the buffered data read-out instruction, the second identifier being an identifier of to-be-output data;
  querying a resource management table according to the second identifier to sequentially obtain addresses of at least two second storage particles associated with the to-be-output data, the second storage particles being distributed in the at least two storage blocks; reading out second fragmented data from the storage particles of the at least two storage blocks according to the addresses of the second storage particles in a time division multiplexing manner; and splicing the second fragmented data until the to-be-output data are obtained.

Optionally, a number of data buffer read-out instructions is at least two, and the number of the buffered data read-out instructions is less than or equal to that of the storage blocks;
the extracting a second identifier from the buffered data read-out instruction includes: extracting a second identifier from each of the buffered data read-out instructions;
the reading out second fragmented data from the storage particles of the at least two storage blocks according to the addresses of the second storage particles in a time division multiplexing manner includes:
for the addresses of the second storage particles, reading out the second fragmented data from storage addresses of the at least two storage blocks in a time division multiplexing manner according to the addresses of the second storage particles, where the storage blocks corresponding to the respective second fragmented data being read at the same time are different from each other; and
the splicing the second fragmented data until the to-be-output data are obtained includes:
splicing the second fragmented data corresponding to each second identifier respectively until all the to-be-output data are obtained.

In a third aspect, an embodiment of the present disclosure provides an apparatus for storing and reading cached data, the apparatus is applied to a computing device, the computing device includes a buffer storage area, the buffer storage area includes at least two storage blocks, and each of the storage blocks has an independent address bus and data bus and a plurality of storage particles; and the apparatus includes:
a data segmentation unit, configured to, in response to receiving to-be-cached data, segment the to-be-cached data sequentially into at least two pieces of first fragmented data;
a data write unit, configured to write the first fragmented data sequentially into first storage particles of the at least two storage blocks in a time division multiplexing manner, and to ensure that the first fragmented data written into the respective first storage particles are different from each other; and
a correspondence saving unit, configured to save a correspondence between first identifiers of the to-be-cached data and addresses of the first storage particles to a resource management table.

Optionally, a number of the to-be-cached data is a plurality of groups, and the number of the groups of the to-be-cached data is less than or equal to that of the storage blocks; and
the data write unit writes the first fragmented data corresponding to each group of the to-be-cached data simultaneously into the first storage particles of the at least two storage blocks in a time division multiplexing manner, where the storage blocks corresponding to the respective first fragmented data being written at the same time are different from each other.

Optionally, the data write unit writes the first fragmented data corresponding to each group of the to-be-cached data simultaneously in a round robin fashion into the first storage particles of the at least two storage blocks in a time division multiplexing manner, until all the first fragmented data are written into the buffer storage area.

Optionally, a storage capacity of storage particles in each storage block is the same; and the data segmentation unit segments the to-be-cached data sequentially into the at least two pieces of first fragmented data according to the storage capacity of storage particles.

Optionally, the foregoing apparatus further includes: an identifier extraction unit, configured to, in response to obtaining a buffered data read-out instruction, extract a second identifier from the buffered data read-out instruction, the second identifier being an identifier of to-be-output data, where a sum of groups of the to-be-output data the and the to-be-buffered data is less than or equal to the number of the storage blocks; a relationship query unit, configured to query the resource management table according to the second identifier to sequentially obtain addresses of at least two second storage particles associated with the to-be-output data, the second storage particles being distributed in the at least two storage blocks; a data read-out unit, configured to read out second fragmented data from the at least two storage blocks according to the addresses of the second storage particles in a time division multiplexing manner when the data write unit writes the first fragmented data sequentially into the first storage particles of the at least two storage blocks in a time division multiplexing manner, where the storage block corresponding to each first fragmented data being written and the storage block corresponding to each second fragmented data being read out at the same time are different from each other; and a data splicing unit, configured to splice the second fragmented data that are read out until the to-be-output data are obtained.

In a fourth aspect, an embodiment of the present disclosure provides an apparatus for storing and reading cached data, the apparatus is applied to a computing device, the computing device includes a buffer storage area, the buffer storage area includes at least two storage blocks, each of the storage blocks has a plurality of storage particles and an independent system bus; and the apparatus includes:
an identifier extraction unit, configured to, in response to obtaining a buffered data read-out instruction, extract a second identifier from the buffered data read-out instruction, the second identifier being an identifier of to-be-output data;
a relationship query unit, configured to query the resource management table according to the second identifier to sequentially obtain addresses of at least two second storage particles associated with the to-be-output data, the second storage particles being distributed in the at least two storage blocks;
a data read-out unit, configured to read out second fragmented data from the storage particles of the at least two storage blocks according to the addresses of the second storage particles in a time division multiplexing manner; and
a data splicing unit, configured to splice the second fragmented data until the to-be-output data are obtained.

Optionally, a number of data buffer read-out instructions is at least two, and the number of the buffered data read-out instructions is less than or equal to that of the storage blocks; for the addresses of the second storage particles, the data read-out unit reads out the second fragmented data from storage addresses of the at least two storage blocks in a time division multiplexing manner according to the addresses of the second storage particles, where the storage blocks corresponding to the respective second fragmented data being read at the same time are different from each other; and the data splicing unit splices the second fragmented data corresponding to each second identifier respectively until all the to-be-output data are obtained.

In a fifth aspect, an embodiment of the present disclosure provides a computing device, including a processor, a volatile memory, and a non-volatile memory, where the volatile memory includes at least two storage blocks, each of the storage blocks has an independent system bus and a plurality of storage particles, and the non-volatile memory is used for storing a computer program; and when the computer program is loaded by the processor, the processor is enabled to execute the foregoing method for storing and reading cached data.

In a sixth aspect, an embodiment of the present disclosure provides a computer-readable storage medium, the storage medium stores a computer program, and when the computer program is executed by a processor, the processor is enabled to implement the foregoing method for storing and reading cached data.

Compared to existing technologies, the technical solutions provided in the embodiments of the present disclosure have the following advantages:

According to the solutions provided in the embodiments of the present disclosure, the computing device writes first fragmented data of to-be-cached data into storage particles of at least two storage blocks in a time division multiplexing manner, or reads out second fragmented data from storage particles of at least two storage blocks, and splices the second fragmented data that are read out into to-be-output data. The fragmented data are stored and read in the time division multiplexing manner, and the fragmented data corresponding to a complete data are stored in different storage blocks, so a plurality of data can be stored and read in a complete data storage and read process, thereby reducing read and write time overhead during the execution of a large number of buffered data storage and read tasks.

BRIEF DESCRIPTION OF THE DRAWINGS

The accompanying drawings here, which are incorporated into the specification and constitute a part of the specification, illustrate embodiments that conform to the present disclosure and are used together with the specification to explain the principles of the present disclosure.

In order to explain the technical solutions in the embodiments of the present disclosure or in the related art more clearly, the accompanying drawings required in the description of the embodiments or the related art will be briefly introduced below. It is obvious that for those of ordinary skill in the art, other drawings can be derived based on the accompanying drawings without any creative effort.

FIG. 5 is a flowchart of another method for storing and reading cached data provided in an embodiment of the present disclosure;

DETAILED DESCRIPTION

Embodiments of the present disclosure will be described in more detail below with reference to the accompanying drawings. Although some embodiments of the present disclosure are shown in the accompanying drawings, it should be appreciated that the present disclosure may be implemented in various forms and should not be construed as being limited to the embodiments described here, and these embodiments are provided in a round robin fashion for more thorough and complete understanding of the present disclosure. It should be understood that the drawings and embodiments of the present disclosure are merely illustrative, but are not intended to limit the scope of the present disclosure.

The term "include" used here and variations thereof are open-ended inclusion, namely, "include but not limited to". The term "based on" is "based at least in part on". The term "one embodiment" represents "at least one embodiment"; the term "another embodiment" represents "at least one other embodiment"; and the term "some embodiments" represents "at least some embodiments". Relevant definitions of other terms will be provided in the following description. It should be noted that the concepts such as "first" and "second" mentioned in the present disclosure are only used to distinguish different apparatuses, modules or units, and are not intended to limit the order or interdependence of the functions performed by these apparatuses, modules or units.

It should be noted that the modifications of "one" and "a plurality of" mentioned in the present disclosure are illustrative rather than restrictive, and those skilled in the art should understand that unless otherwise explicitly stated in the context, "one" and "a plurality of" should be understood as "one or more".

Embodiments of the present disclosure provide a method for storing and reading buffered data, which is applied to a computing device and achieves concurrent read and write of buffered data by changing a storage and read strategy for buffered data, thereby improving read and write speed of cached data in the computing device.

Because the method for storing and reading buffered data, provided in the embodiments of the present disclosure, needs to be performed in a buffer storage area with a specific architecture, before the method for storing and reading buffered data is explained, the architecture of the specific buffer storage area is analyzed first.

The buffer storage area provided in the embodiments of the present disclosure has at least two storage blocks. The foregoing at least two storage blocks are storage blocks capable of achieving independent control on data storage and read, that is, the foregoing storage blocks are storage blocks with independent address buses and data buses. In a process of storing and reading cached data, each storage block can concurrently store and read cached data through the corresponding address bus and data bus at a time.

Figure 1:
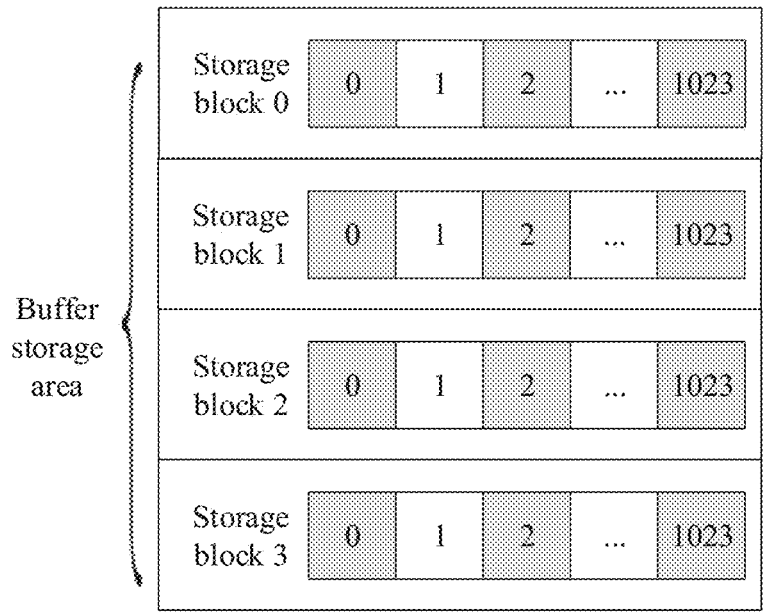
FIG. 1 is a schematic diagram of an architecture of a cache storage area provided in an embodiment of the present disclosure.

FIG. 1 is a schematic diagram of an architecture of a cache storage area provided in an embodiment of the present disclosure. As shown in FIG. 1, in a specific embodiment, the cache storage area includes 4 storage blocks (the 4 storage blocks are numbered 0, 1, 2, and 3 respectively). The four storage blocks have independent address buses and data buses, which can achieve concurrent storage and read of four paths of cached data. In other embodiments, a number of the storage blocks included in the cache storage area is not limited to 4, and may also be other quantities, but a minimum number of the storage blocks is two.

Each of the foregoing storage blocks has a plurality of storage particles. For example, each storage block shown in FIG. 1 includes 1024 storage particles. The storage particles are data storage units with predetermined capacity, which are essentially formed by a combination of a plurality of consecutive bits in the storage block. For example, in an application, the storage capacity of a storage particle may be 1024 bit. The storage capacity of the storage particle is not limited to the foregoing 1024 bit, but may also be other capacities.

It should be noted that the buffer storage area may be a storage area located in a random access memory (RAM) or a storage area located in a cache, which is not limited by the embodiments of the present disclosure.

Figure 2:
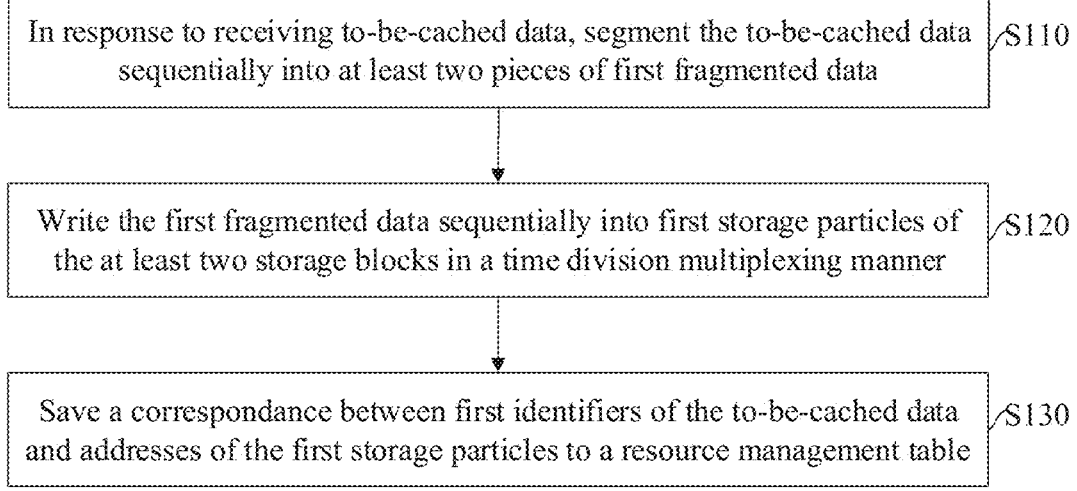
FIG. 2 is a flowchart of a method for storing and reading cached data provided in an embodiment of the present disclosure.

FIG. 2 is a flowchart of a method for storing and reading cached data provided in an embodiment of the present disclosure. As shown in FIG. 2, the method for storing and reading cached data provided in the embodiment of the present disclosure includes S110-S130. The method shown in FIG. 2 is performed by a computing device configured with the foregoing buffer storage area.

S110: In response to receiving to-be-cached data, segment the to-be-cached data sequentially into at least two pieces of first fragmented data.

In the embodiment of the present disclosure, after the computing device is powered on, the computing device completes its initialization and configures a preset number of storage blocks in a corresponding physical memory (namely, the foregoing RAM or cache) to prepare for storing cached data.

The to-be-cached data is data to be stored in the buffer storage area. The to-be-cached data may be data obtained by CPU operations or data loaded from a non-volatile memory.

After receiving the to-be-cached data, the computing device segment the to-be-cached data to obtain at least two pieces of first fragmented data. In specific implementation, the computing device may segment the to-be-cached data in a streaming manner to obtain the at least two pieces of first fragmented data. The foregoing streaming means, after obtaining a portion of the to-be-cached data, using the portion as a piece of first fragmented data.

In specific implementation, in order to make full use of the capacity of storage particles, the computing device may use the capacity of storage particles as a segmentation capacity to segment the to-be-cached data into the at least two pieces of first fragmented data.

S120: Write the first fragmented data sequentially into first storage particles of the at least two storage blocks in a time division multiplexing manner.

S130: Save a correspondence between first identifiers of the to-be-cached data and addresses of the first storage particles to a resource management table.

In the embodiment of the present disclosure, after the storage blocks are segmented to obtain at least one piece of first fragmented data, the computing device writes the first fragmented data into the first storage particle in each of the foregoing storage blocks in a time division multiplexing manner, and the first fragmented data written into the respective first storage particles are different from each other.

Writing data in a time division multiplexing manner indicates that, when a first fragmented data in the to-be-cached data is written into a first storage particle, the other fragmented data in the to-be-cached data is not simultaneously written into other storage blocks. That is, first fragmented data segmented from a to-be-cached data will be written into the storage blocks in chronological order, and will not be written into at least two storage blocks simultaneously.

It should be noted that the first fragmented data written into each first storage block are different from each other. The foregoing different from each other only indicates that the numbers of the first fragmented data are different from each other, and does not indicate that the data contents of the first fragmented data are not the same. In practical implementation, due to the data characteristics of the to-be-cached data, the data contents of the segmented first fragmented data may be the same. According to the fact that the first fragmented data written into each first storage block are different from each other, it can be known that each first fragmented data of the to-be-cached data is written into the cache storage area only once.

In specific implementation, in order to achieve successful storage of the to-be-cached data in the buffer storage area, after receiving the to-be-cached data, a resource management module in the computing device first determines whether there are enough storage resources for allocation. If there are not enough storage resources available for allocation, the computing device may discard the to-be-cached data. When the storage particles are enough, the computing device may obtain addresses of idle storage particles and then write the first fragmented data into the corresponding storage particles.

After the addresses of storage particles in a space are allocated for the first fragmented data, in order to enable subsequent search for the first fragmented data and splice the first fragmented data to obtain the foregoing to-be-cached data, the computing device also writes the correspondence between the first identifiers of the to-be-cached data and the addresses of storage particles (namely, the addresses of the first storage particles) into the resource management table. Because the first fragmented data are sequentially stored into the buffer storage area, the computing device can write the address of each sequentially allocated first storage particle into the resource management table in a streaming manner.

As described earlier, in the embodiment of the present disclosure, the computing device writes the first fragmented data into the first storage particles of the at least two storage blocks, that is, the first fragmented data segmented from the to-be-cached data are dispersed and stored in the at least two storage blocks. Meanwhile, because the computing device stores the first fragmented data of the to-be-cached data in a time division multiplexing manner, the to-be-cached data can occupy the address bus and data bus of only one data block at a time. Therefore, when a to-be-cached data is stored, the address buses and data buses of other storage blocks are not occupied, and the storage blocks, the corresponding buses of which are not occupied, can be used for storing and reading other cached data. When S120 is performed, each storage block can concurrently perform data storage and read operations. That is, the computing device can concurrently perform a plurality of storage and read tasks by using the method for storing and reading buffered data provided in the embodiments of the present disclosure. Because the plurality of storage and read tasks can be concurrently performed, the data read and write time overhead of the computing device when performing a large number of cached data storage and read tasks can be correspondingly reduced.

The method for storing and reading buffered data, provided in the embodiments of the present disclosure, will be analyzed below by examples.

Figure 3:
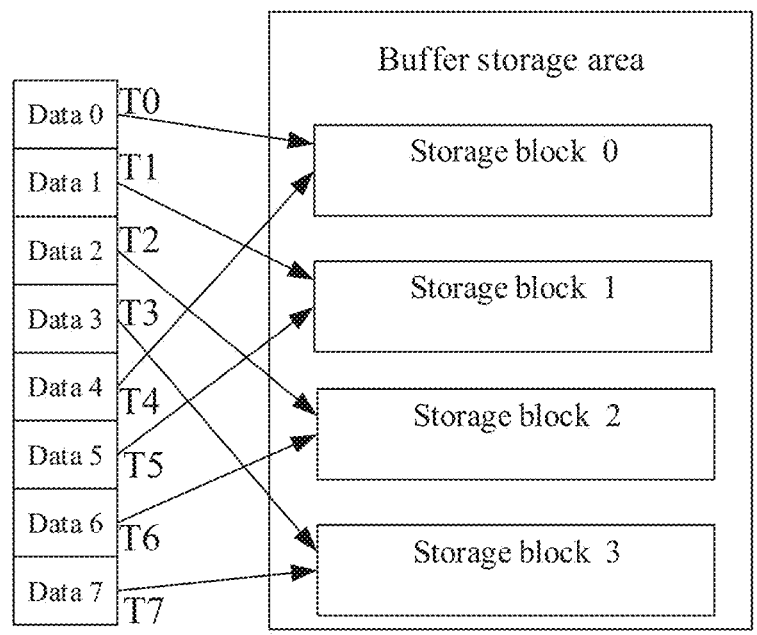
FIG. 3 is a schematic diagram of a storage process of cached data in some cases according to an embodiment of the present disclosure.
Figure 4:
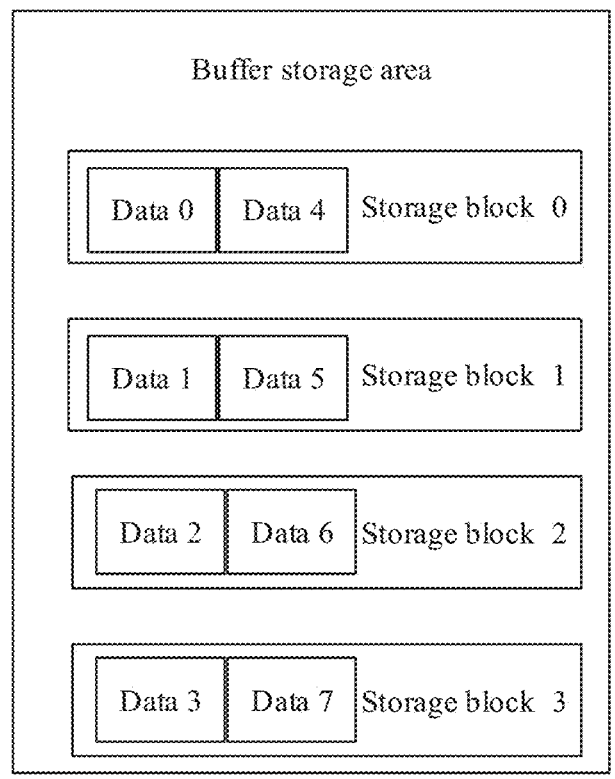
FIG. 4 is a schematic diagram of distribution of first fragmented data obtained based on the storage process in FIG. 3.

FIG. 3 is a schematic diagram of a storage process of cached data in some cases according to an embodiment of the present disclosure, and FIG. 4 is a schematic diagram of distribution of first fragmented data obtained based on the storage process in FIG. 3.

As shown in FIG. 3, in some embodiments, in a period of time, the buffer storage area of the computing device receives only a path of to-be-buffered data, and the to-be-buffered data are segmented into 8 first fragmented data. At time T0, the first fragmented data numbered Data0 is written into the first storage particle of storage block 0; at time T1, the first fragmented data numbered Data1 is written into the first storage particle of storage block 1; at time T2, the first fragmented data numbered Data2 is written into the first storage particle of storage block 2; at time T3, the first fragmented data numbered Data3 is written into the first storage particle of storage block 3; at time T4, the first fragmented data numbered Data4 is written into the second storage particle of storage block 1; at time T5, the first fragmented data numbered Data5 is written into the second storage particle of storage block 2; at time T6, the first fragmented data numbered Data6 is written into the second storage particle of storage block 3; and at time T7, the first fragmented data numbered Data7 is written into the second storage particle in storage block 3.

In this way, the first fragmented data are stored as shown in FIG. 3, with Data0 and Data4 in storage block 0, Data1 and Data5 in storage block 2, Data2 and Data6 in storage block 2, and Data3 and Data7 in storage block 3.

As shown in FIG. 3, at time T0 and T4, the buses of storage blocks 1, 2, and 3 are idle; at time T1 and T5, the buses of storage blocks 0, 1, and 2 are idle; at time T2 and T6, the buses of storage blocks 0, 1, and 3 are idle; and at time T3 and T7, the buses of storage blocks 0, 1, and 2 are idle. In the presence of many storage and read tasks, if storage positions of other buffered data are reasonably arranged, the computing device can simultaneously use the buses of 4 storage blocks to implement 4 paths of concurrent storage and read. If the data bus of each storage block has a bandwidth of xGbit/s, the data bus of the computing device configured with 4 storage blocks theoretically can reach 4xGbit/s.

FIG. 5 is a flowchart of another method for storing and reading cached data provided in an embodiment of the present disclosure. As shown in FIG. 5, the method for storing and reading cached data provided in the embodiment of the present disclosure includes S210-S230.

S210: In response to receiving a plurality of groups of to-be-cached data, segment each group of to-be-cached data sequentially into at least two pieces of first fragmented data.

In the embodiment of the present disclosure, the foregoing plurality of groups of to-be-cached data are at least two groups, and a number of the groups of the to-be-cached data is less than or equal to that of storage blocks M. In specific embodiments, in a case where the number of the plurality of groups of to-be-cached data is greater than that of the storage blocks M, the computing device can determine M groups of to-be-cached data for priority processing by priority arbitration.

Similar to S110 mentioned earlier, in the embodiment of the present disclosure, the computing device segments each group of to-be-cached data sequentially into at least two pieces of first fragmented data. More preferentially, the size of the first fragmented data segmented from each group of to-be-cached data is the same, namely, the storage capacity of a storage particle.

S220: Write the first fragmented data corresponding to each group of to-be-cached data simultaneously into first storage particles of the at least two storage blocks in a time division multiplexing manner, where the storage blocks corresponding to the respective first fragmented data being written at the same time are different from each other.

The concept of time division multiplexing mentioned in S220 is the same as that in S120, indicating that only one of the first fragmented data in a group of to-be-buffered data is written into the storage block at a time.

Unlike the foregoing S120, in this embodiment, the first fragmented data corresponding to at least two groups of to-be-buffered data are stored simultaneously at the same time, and each first fragmented data is written into a different storage block.

S230: Save a correspondence between first identifiers of the to-be-cached data and addresses of the first storage particles to a resource management table.

The execution process of S230 is the same as before and will not be repeated here. Refer to the previous description for details.

Figure 6:
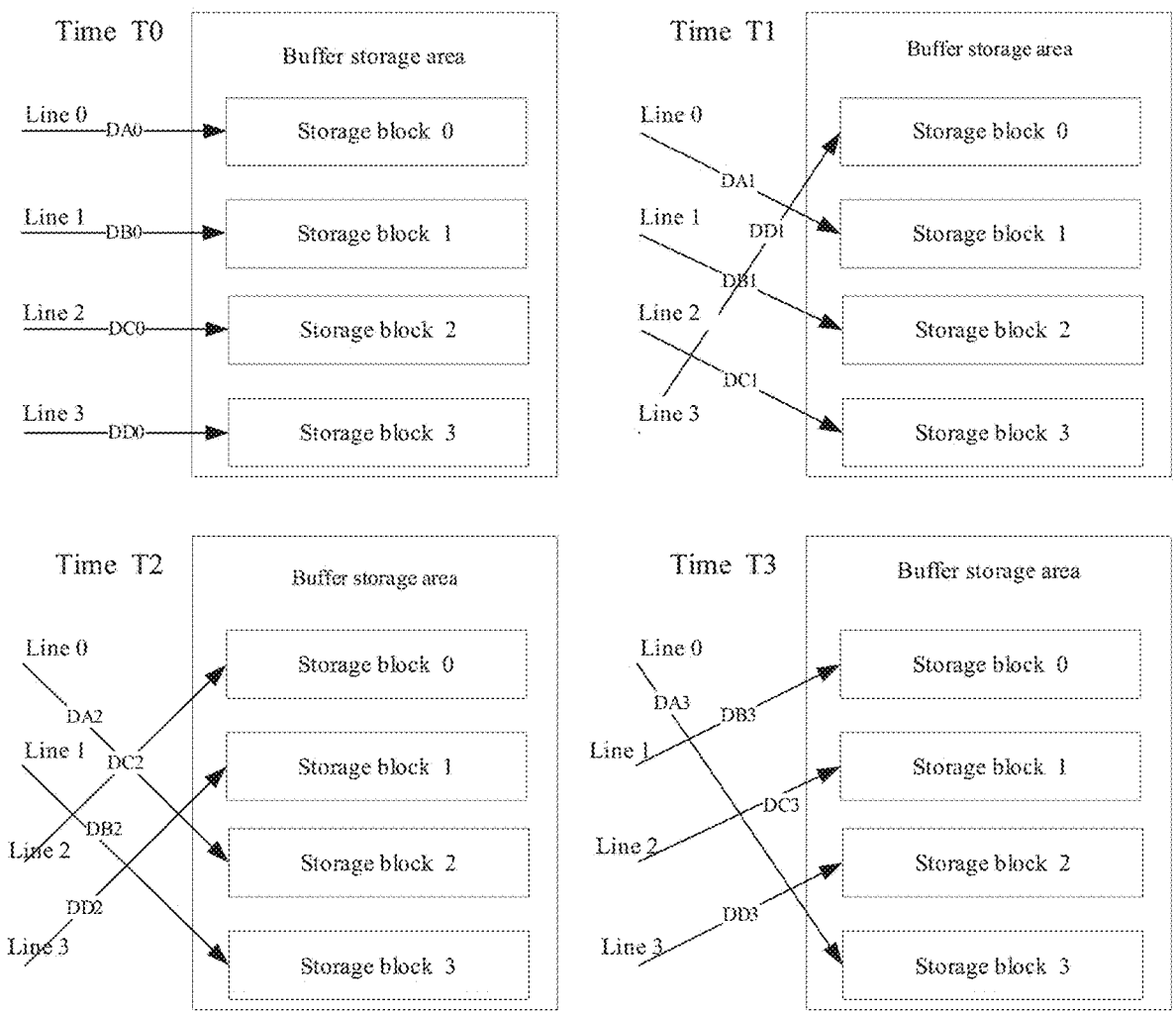
FIG. 6 is a schematic diagram of a storage process of cached data in other cases according to an embodiment of the present disclosure.
Figure 7:
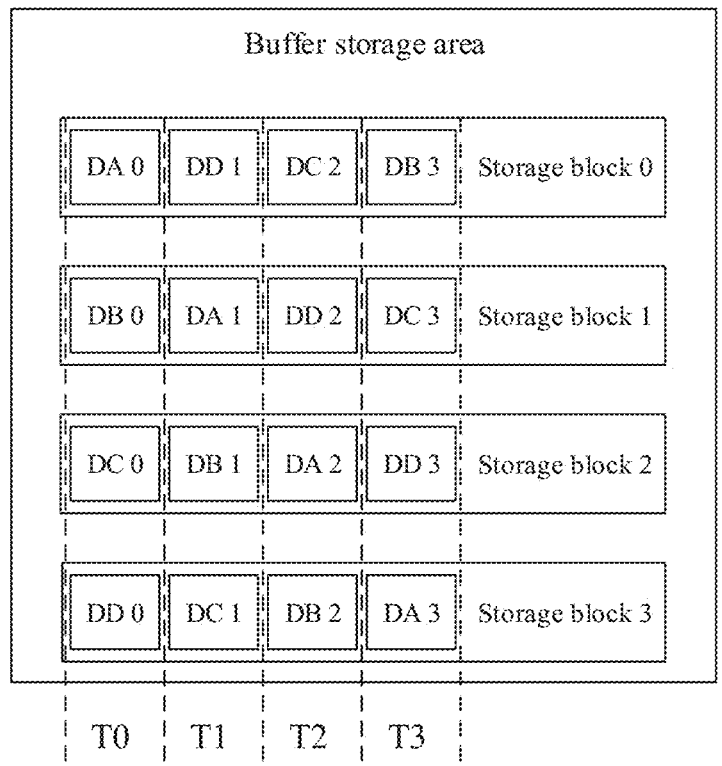
FIG. 7 is a schematic diagram of distribution of first fragmented data obtained based on the storage process in FIG. 6.

FIG. 6 is a schematic diagram of a storage process of cached data in other cases according to an embodiment of the present disclosure, and FIG. 7 is a schematic diagram of distribution of first fragmented data obtained based on the storage process in FIG. 6.

As shown in FIG. 6, in some embodiments, in a period of time, the buffer storage area of the computing device receives 4 paths of to-be-buffered data, and each group of to-be-buffered data is segmented into 5 first fragmented data. The first fragmented data in the groups of to-be-buffered data are numbered DA0-DA4, DB0-DB4, DC0-DC4, and DD0-DD4.

At time T0, the first fragmented data numbered DA0 is written into the first storage particle of storage block 0, the first fragmented data numbered DB0 is written into the first storage particle of storage block 1, the first fragmented data numbered DC0 is written into the first storage particle of storage block 2, and the first fragmented data numbered DD0 is written into the first storage particle of storage block 3;

At time T1, the first fragmented data numbered DA1 is written into the first storage particle of storage block 1, the first fragmented data numbered DB1 is written into the first storage particle of storage block 2, the first fragmented data numbered DC1 is written into the first storage particle of storage block 3, and the first fragmented data numbered DD1 is written into the first storage particle of storage block 0;

At time T2, the first fragmented data numbered DA2 is written into the first storage particle of storage block 2, the first fragmented data numbered DB3 is written into the first storage particle of storage block 3, the first fragmented data numbered DC2 is written into the first storage particle of storage block 0, and the first fragmented data numbered DD3 is written into the first storage particle of storage block 1;

At time T3, the first fragmented data numbered DA3 is written into the first storage particle of storage block 3, the first fragmented data numbered DB3 is written into the first storage particle of storage block 0, the first fragmented data numbered DC3 is written into the first storage particle of storage block 1, and the first fragmented data numbered DD3 is written into the first storage particle of storage block 2.

At time T5, the first fragmented data numbered DA5 is written into the first storage particle of storage block 1, the first fragmented data numbered DB5 is written into the first storage particle of storage block 2, the first fragmented data numbered DC5 is written into the first storage particle of storage block 3, and the first fragmented data numbered DD5 is written into the first storage particle of storage block 0.

As shown in FIG. 7, the cached data stored in each storage block are as follows: storage block 0 {DA0, DD1, DC1, DB3, DA4}, storage block 1 {DB0, DA1, DD2, DC3, DB4}, storage block 2 {DC0, DB1, DA2, DD3, DC4}, and storage block 4 {DD0, DC1, DB2, DA3, DD4}.

In addition, as can be seen from the above examples, because each to-be-cached data is simultaneously written into a different storage block by time division multiplexing, each to-be-cached data is stored concurrently without interference, and the bandwidth of the data bus of the computing device reaches theoretical 4xGbit/s.

As mentioned earlier, in some embodiments of the present disclosure, the computing device, when executing S220, writes the first fragmented data corresponding to each group of to-be-cached data simultaneously in a round robin fashion into the first storage particles of the at least two storage blocks in a time division multiplexing manner, until all the first fragmented data are written into the buffer storage area.

In specific implementation, the foregoing operation is carried out in a sequential manner, that is, the first fragmented data of each to-be-cached data are stored sequentially in data blocks 0-3, and storage blocks are stored sequentially when resources of storage particles are allocated, so the overhead of additional resources is relatively low.

Figure 8:
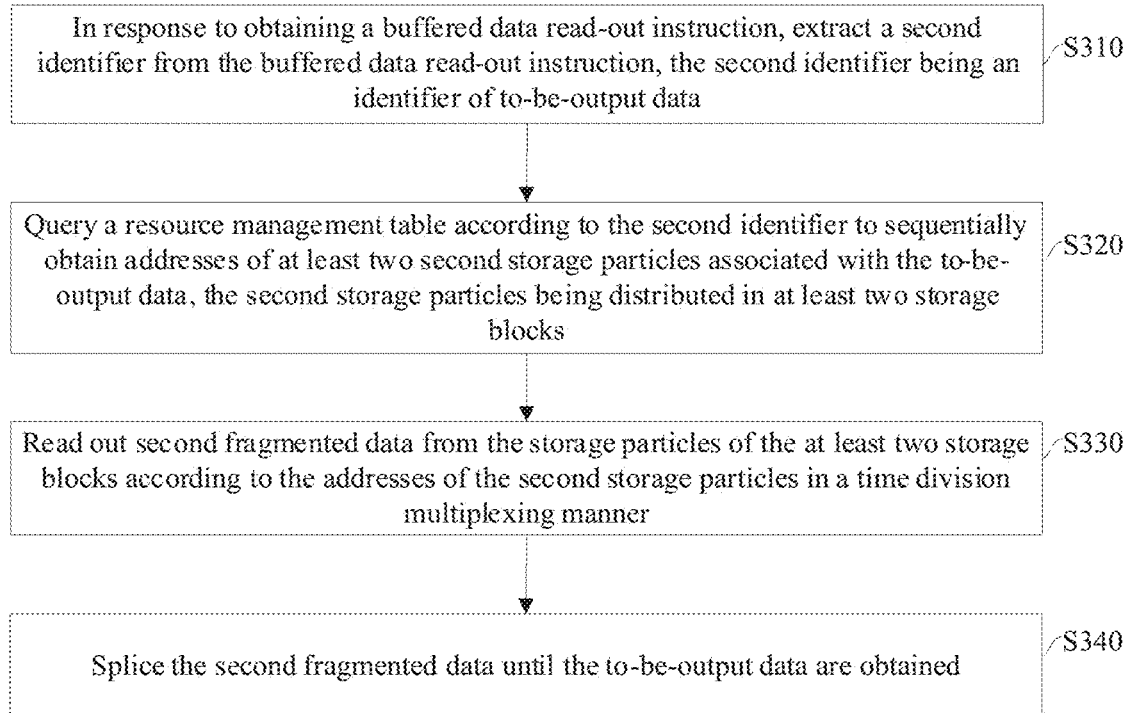
FIG. 8 is a flowchart of a method for storing and reading data provided in some further embodiments of the present disclosure.

FIG. 8 is a flowchart of a method for storing and reading data provided in some further embodiments of the present disclosure. As shown in FIG. 8, in some further embodiments of the present disclosure, the method for storing and reading data includes S310-S340.

S310: In response to obtaining a buffered data read-out instruction, extract a second identifier from the buffered data read-out instruction, the second identifier being an identifier of to-be-output data.

S320: Query a resource management table according to the second identifier to sequentially obtain addresses of at least two second storage particles associated with the to-be-output data, the second storage particles being distributed in at least two storage blocks.

Before executing S310, after determining the to-be-output data, the computing device generates the corresponding buffered data read-out instruction to a buffered data storage and read management module.

After the buffered data storage and read management module obtains the buffered data read-out instruction, the second identifier of the to-be-output data is obtained. Subsequently, the resource management table is queried according to the second identifier to obtain the addresses of the second storage particles corresponding to the to-be-output data. Second fragmented data corresponding to the to-be-output data are stored in data particles corresponding to the foregoing addresses.

S330: Read out second fragmented data from the storage particles of the at least two storage blocks according to the addresses of the second storage particles in a time division multiplexing manner.

S340: Splice the second fragmented data until the to-be-output data are obtained.

Subsequently, the computing device reads out the second fragmented data sequentially according to the addresses of the second storage particles in a time division multiplexing manner. It should be noted that the foregoing second fragmented data are stored in at least two storage blocks. That is, after some second fragmented data are read from one storage block, other second fragmented data need to be read from the other storage block in order to obtain all second fragmented data used for splicing the to-be-output data.

Because all the second fragmented data corresponding to the to-be-output data need to be read out from two storage blocks, the data bus and address bus of a data block will not always be used for outputting the second fragmented data corresponding to the to-be-output data in the period of time for reading the to-be-output data, but can perform other data storage and read tasks.

That is, the computing device can concurrently perform a plurality of storage and read tasks by using the method for storing and reading buffered data provided in the embodiments of the present disclosure. Because the plurality of storage and read tasks can be concurrently performed, the data read and write time overhead of the computing device when performing a large number of cached data storage and read tasks can be correspondingly reduced.

Figure 9:
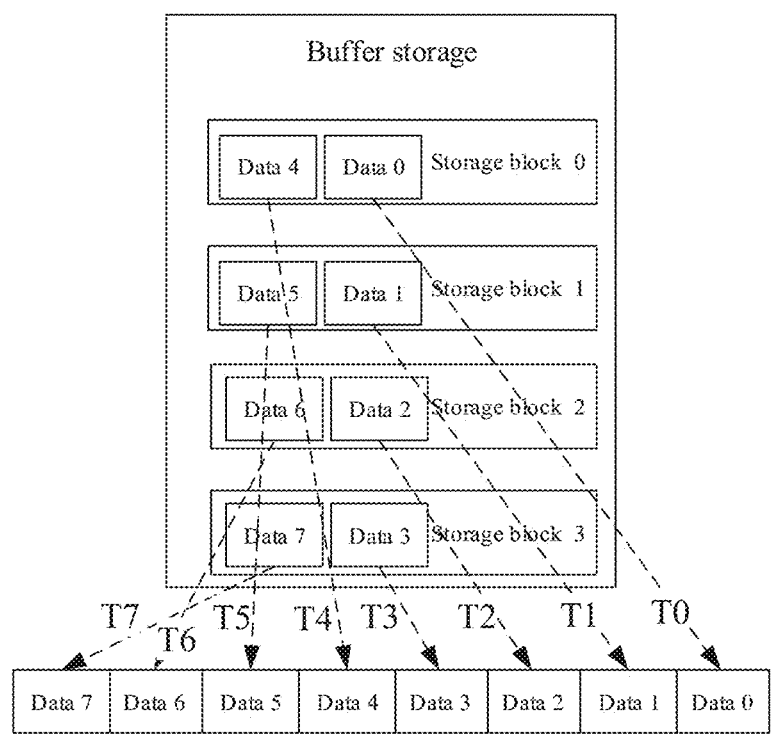
FIG. 9 is a schematic diagram of a read-out process of cached data in some cases according to an embodiment of the present disclosure.

FIG. 9 is a schematic diagram of a read-out process of cached data in some cases according to an embodiment of the present disclosure. The cached data shown in FIG. 9 are the data stored in the storage space in FIG. 3. As shown in FIG. 9, in a period of time, the computing device only needs to read out a cached data. At time T0, the second fragmented data numbered Data0 is read out from storage block 0; at time T1, the second fragmented data numbered Data1 is read out from storage block 1; at time T2, the second fragmented data numbered Data2 is read out from storage block 2; at time T3, the first fragmented data numbered Data3 is read out from storage block 3; at time T4, the second fragmented data numbered Data4 is read out from storage block 0; at time T5, the second fragmented data numbered Data5 is read out from storage block 1; at T6 time, the second fragmented data numbered Data6 is read out from storage block 2; at time T7, the first fragmented data numbered Data7 is read out from storage block 3; and then the second fragmented data are spliced according to the foregoing read-out order to obtain the to-be-output data.

In some embodiments of the present disclosure, the computing device obtains at least two buffered data read-out instructions when executing S310, but the number of the buffered data read-out instructions is less than or equal to that of the storage blocks. Extracting a second identifier from the buffered data read-out instruction in step S320 mentioned above is specifically: extracting a second identifier from each of the buffered data read-out instructions.

Correspondingly, in a case of extracting a second identifier from each of the buffered data read-out instructions, S320 specifically includes S321: for the addresses of the second storage particles, reading out the second fragmented data from storage addresses of the at least two storage blocks in a time division multiplexing manner according to the addresses of the second storage particles, where the storage blocks corresponding to the respective second fragmented data being read at the same time are different from each other.

Figure 10:
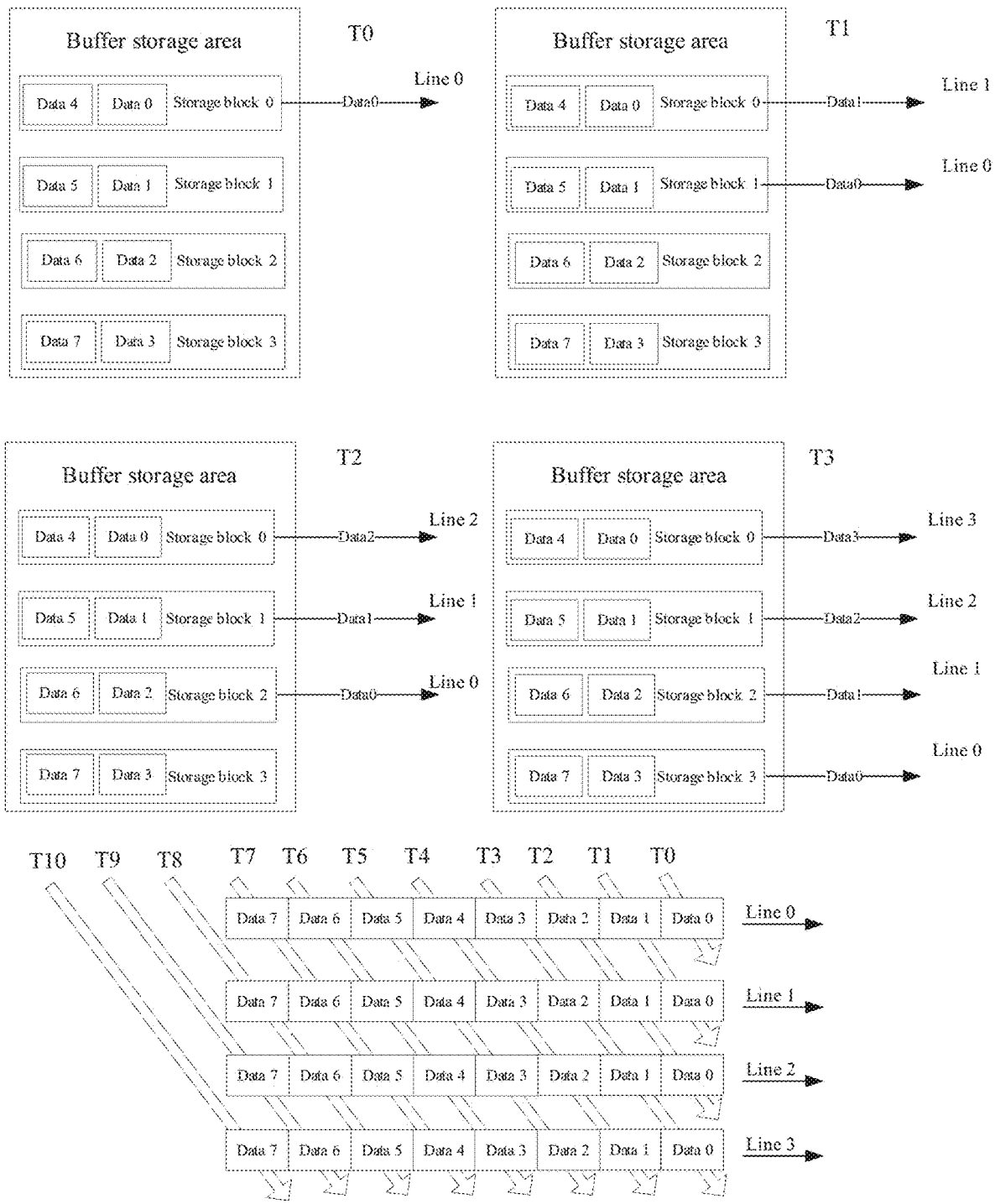
FIG. 10 is a schematic diagram of a read-out process of cached data in other cases according to an embodiment of the present disclosure.

FIG. 10 is a schematic diagram of a read-out process of cached data in other cases according to an embodiment of the present disclosure. The cached data in FIG. 10 are the data stored in the storage space in FIG. 3. As shown in FIG. 10, in a period of time, a plurality of data request instructions needs to read out buffered data shown in FIG. 3, and data read-out lines corresponding to the data request instructions are line 0, line 1, line 2, and line 3, respectively.

As shown in FIG. 10, at time T0, the second fragmented data Data0 stored in storage block 0 is read out and transmitted to line 0; at time T1, the second fragmented data Data1 stored in storage block 1 is read out and transmitted to line 0, and the second fragmented data Data0 stored in storage block 0 is read out and transmitted to line 1; at time T2, the second fragmented data Data2 stored in storage block 2 is read out and transmitted to line 0, the second fragmented data Data1 stored in storage block 1 is read out and transmitted to line 1, and the second fragmented data Data0 stored in storage block 0 is read out and transmitted to line 2; at time T3, the second fragmented data Data3 stored in storage block 3 is read out and transmitted to line 0, the second fragmented data Data2 stored in storage block 2 is read out and transmitted to line 1, the second fragmented data Data1 stored in storage block 1 is read out and transmitted to line 2, and the second fragmented data Data0 stored in storage block 0 is read out and transmitted to line 3; subsequently, at time T4, the second fragmented data Data2 stored in storage block is read out and transmitted to line 0, the second fragmented data Data3 stored in storage block 3 is read out and transmitted to line 1, the second fragmented data Data2 stored in storage block 2 is read out and transmitted to line 2, and the second fragmented data Data1 stored in storage block 1 is read out and transmitted to line 3; . . . ; at time T7, the second fragmented data Data7 stored in storage block 3 is read out and transmitted to line 0, the second fragmented data Data6 stored in storage block 2 is read out and transmitted to line 1, the second fragmented data Data5 stored in storage block 1 is read out and transmitted to line 2, and the second fragmented data Data4 stored in storage block 0 is read out and transmitted to line 3; and then, line 0 obtains the to-be-output data.

Later, at time T8, the second fragmented data Data7 stored in storage block 3 is read out and transmitted to line 1, the second fragmented data Data6 stored in storage block 2 is read out and transmitted to line 2, and line 1 obtains the to-be-output data.

Later, at time T9, the second fragmented data Data7 stored in storage block 3 is read out and transmitted to line 2, the second fragmented data Data6 stored in storage block 2 is read out and transmitted to line 2, and line 2 obtains the to-be-output data.

Finally, at time T10, the second fragmented data Data7 stored in storage block 3 is read out and transmitted to line 3, and line 3 also obtains the to-be-output data.

Based on the foregoing analysis, in the embodiment of the present disclosure, the computing device uses 11 time periods to complete the output of the same to-be-output data to four lines. Compared to the existing technology that requires 32 time periods to complete data transmission, the present disclosure can significantly improve the data read-out rate.

Figure 11:
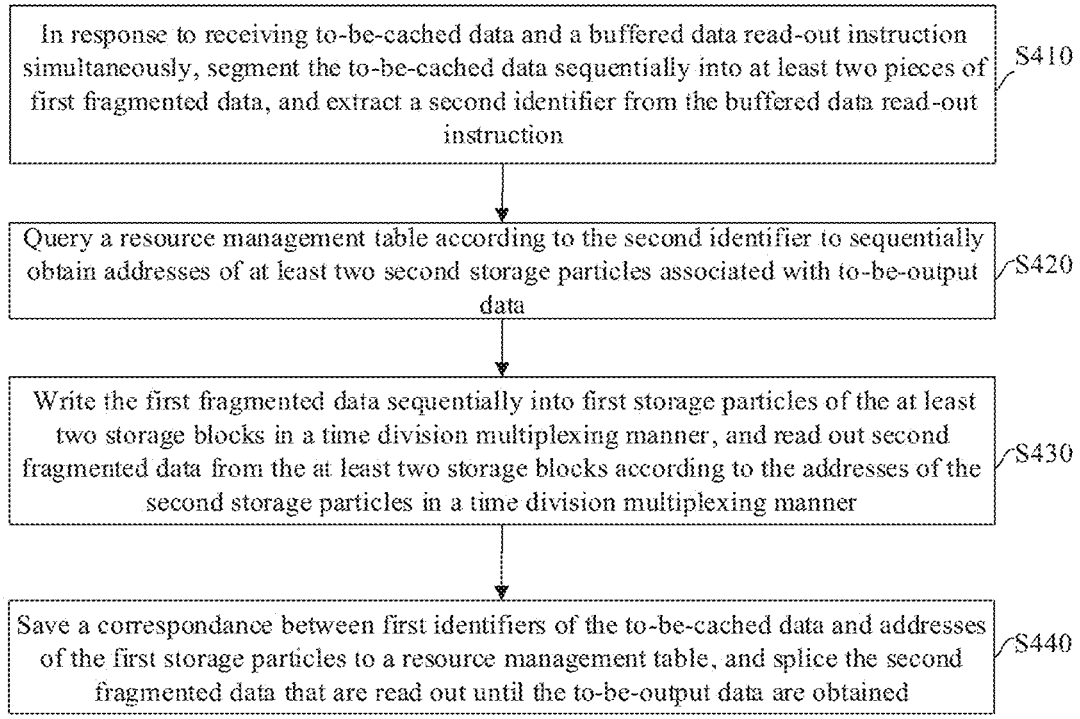
FIG. 11 is a flowchart of a method for storing and reading data provided in some further embodiments of the present disclosure.

FIG. 11 is a flowchart of a method for storing and reading data provided in some further embodiments of the present disclosure. As shown in FIG. 11, in some further embodiments of the present disclosure, the method for storing and reading data includes S410-S440.

S410: In response to receiving to-be-cached data and a buffered data read-out instruction simultaneously, segment the to-be-cached data sequentially into at least two pieces of first fragmented data, and extract a second identifier from the buffered data read-out instruction.

The foregoing second identifier is an identifier of to-be-output data. In the embodiments of the present disclosure, a sum of groups of the to-be-output data and the to-be-buffered data is less than or equal to a number of storage blocks. For example, when the number of storage blocks is 4, the maximum sum of groups of the to-be-output data and the to-be-buffered data is 4.

S420: Query a resource management table according to the second identifier to sequentially obtain addresses of at least two second storage particles associated with to-be-output data.

The second storage particles are distributed in at least two storage blocks. In specific implementation, the execution process of S420 mentioned above is the same as that of S320 and will not be repeated here.

S430: Write the first fragmented data sequentially into first storage particles of the at least two storage blocks in a time division multiplexing manner and read out second fragmented data from the at least two storage blocks according to the addresses of the second storage particles in a time division multiplexing manner.

S440: Save a correspondence between first identifiers of the to-be-cached data and addresses of the first storage particles to a resource management table and splice the second fragmented data that are read out until the to-be-output data are obtained.

In the embodiments of the present disclosure, when writing the first fragmented data into the first storage particles of the at least two storage blocks in a time division multiplexing manner, the computing device simultaneously reads out the second fragmented data from the at least two storage blocks according to the addresses of the second storage particles.

Figure 12:
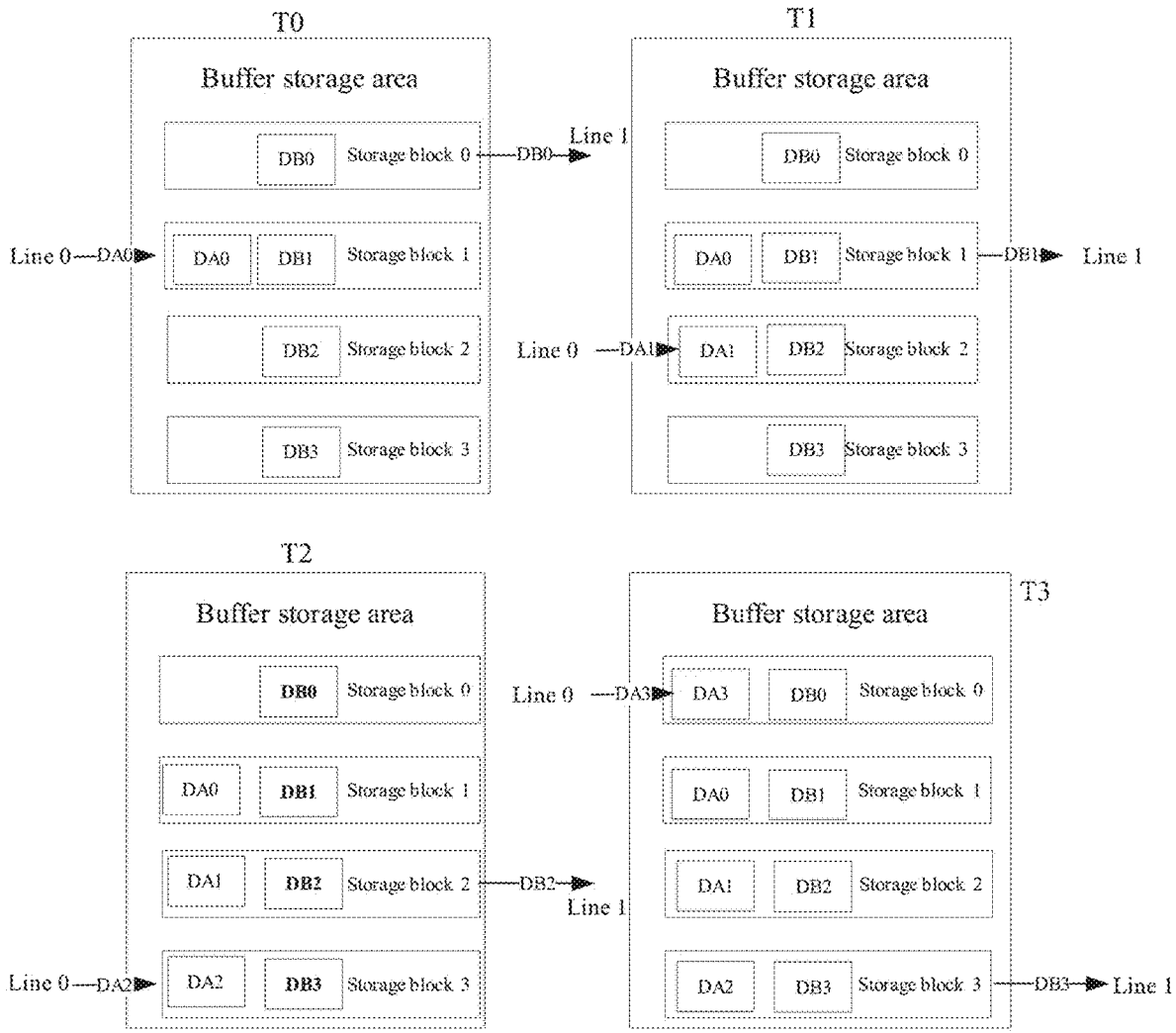
FIG. 12 is a schematic diagram of a buffered data storage and read process provided in some embodiments of the present disclosure.

FIG. 12 is a schematic diagram of a buffered data storage and read process provided in some embodiments of the present disclosure. As shown in FIG. 12, line 0 sends to-be-buffered data DA0-DA3, while line 1 needs to read to-be-output data from data blocks. The to-be-output data are specifically DB0-DB3, where DB0 is stored in storage block 0, DB1 is stored in storage block 1, DB2 is stored in storage block 2, and DB3 is stored in storage block 3. It is assumed that the computing device obtains to-be-buffered data sent by line 1 and a data read-out instruction of line 2 for to-be-output data simultaneously. Because line 2 has a higher priority than line 1, the computing device allocates resources to line 2 first and then to line 1. At time T0, the second fragmented data DB0 stored in storage block 0 is read out and sent to line 2, and the first fragmented data DA0 in line 1 is written into storage block 1; at time T1, the second fragmented data DB1 stored in storage block 1 is read out and sent to line 2, and the first fragmented data DA1 in line 1 is written into storage block 2; at time T2, the second fragmented data DB2 stored in storage block 2 is read out and sent to line 2, and the second fragmented data DA2 in line 1 is written into storage block 3; and at time T3, the second fragmented data DB3 stored in storage block 3 is read out and sent to line 2, and the second fragmented data DA3 in line 1 is written into storage block 0.

That is, write of the to-be-buffered data in line 1 and read of the to-be-output data in line 2 are implemented simultaneously in 4 time periods. Compared to the situation that the to-be-buffered data and the to-be-output data are stored simultaneously in one storage block, the present disclosure can save 4 time periods and improve the efficiency of concurrent data storage and read.

The previous description introduces the method for storing and reading data provided in the embodiments of the present disclosure. In the previous introduction process, a small number of second fragmented data are already stored in data blocks, and the storage particles corresponding to the second fragmented data are not recovered due to the discard of the second fragmented data, so the second fragmented data of the same cached data stored in each storage block are relatively close. In practical applications, when a large number of second fragmented data are stored in data blocks and corresponding storage particles are recovered due to the discard of some of the second fragmented data, the storage of the second fragmented data in the storage blocks presents various complex arrangements, which will not be exemplified in the embodiments of the present disclosure.

It should also be noted that when various methods for storing and reading cached data, provided in the embodiments of the present disclosure, are performed, the buses of the storage blocks are synchronized in clock to ensure that each storage block can concurrently perform respective data storage and read task at a time.

Figure 13:
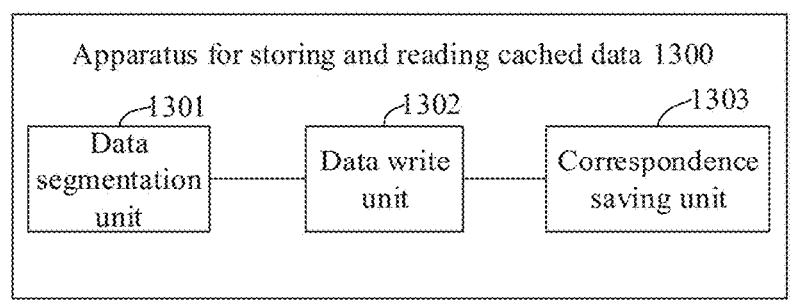
FIG. 13 is a schematic diagram of a structure of an apparatus for storing and reading cached data provided in an embodiment of the present disclosure.

In addition to providing the foregoing methods for storing and reading cached data, an embodiment of the present disclosure further provides a schematic diagram of a structure of an apparatus for storing and reading cached data. FIG. 13 is a schematic diagram of a structure of an apparatus for storing and reading cached data provided in an embodiment of the present disclosure. As shown in FIG. 13, the apparatus for storing and reading cached data 1300 provided in the embodiment of the present disclosure includes a data segmentation unit 1301, a data write unit 1302, and a correspondence saving unit 1303. It should be noted that the apparatus for storing and reading cached data is applied to a computing device, the computing device include a buffer storage area, the buffer storage area includes at least two storage blocks, and each of the storage blocks has an independent address bus and data bus and a plurality of storage particles.

The data segmentation unit 1301 is configured to, in response to receiving to-be-cached data, segment the to-be-cached data sequentially into at least two pieces of first fragmented data; the data write unit 1302 is configured to write the first fragmented data sequentially into first storage particles of the at least two storage blocks in a time division multiplexing manner, and to ensure that the first fragmented data written into the respective first storage particles are different from each other; and the correspondence saving unit 1303 is configured to save a correspondence between first identifiers of the to-be-cached data and addresses of the first storage particles to a resource management table.

In some embodiments, a number of the to-be-cached data is a plurality of groups, and the number of the groups of the to-be-cached data is less than or equal to that of the storage blocks; and the data write unit 1302 writes the first fragmented data corresponding to each group of to-be-cached data simultaneously into first storage particles of the at least two storage blocks in a time division multiplexing manner, where the storage blocks corresponding to the respective first fragmented data being written at the same time are different from each other.

In some embodiments, writing the first fragmented data corresponding to each group of to-be-cached data simultaneously into first storage particles of the at least two storage blocks in a time division multiplexing manner includes: the data write unit 1302 writes the first fragmented data corresponding to each group of to-be-cached data in a round robin fashion into the first storage particles of the at least two storage blocks in a time division multiplexing manner, until all the first fragmented data are written into the buffer storage area.

In some embodiments, a storage capacity of storage particles in each storage block is the same; and the data segmentation unit 1301 segments the to-be-cached data sequentially into at least two pieces of first fragmented data according to the storage capacity of storage particles.

Optionally, the foregoing apparatus further includes: an identifier extraction unit, configured to, in response to obtaining a buffered data read-out instruction, extract a second identifier from the buffered data read-out instruction, the second identifier being an identifier of to-be-output data, where a sum of groups of the to-be-output data and to-be-buffered data is less than or equal to the number of the storage blocks;

a relationship query unit, configured to query the resource management table according to the second identifier to sequentially obtain addresses of at least two second storage particles associated with the to-be-output data, the second storage particles being distributed in the at least two storage blocks;

a data read-out unit, configured to read out second fragmented data from the at least two storage blocks according to the addresses of the second storage particles in a time division multiplexing manner when the data write unit 1302 writes the first fragmented data sequentially into the first storage particles of the at least two storage blocks in a time division multiplexing manner, where the storage block corresponding to each first fragmented data being written and the storage block corresponding to each second fragmented data being read out at the same time are different from each other; and a data splicing unit, configured to splice the second fragmented data that are read out until the to-be-output data are obtained.

Figure 14:
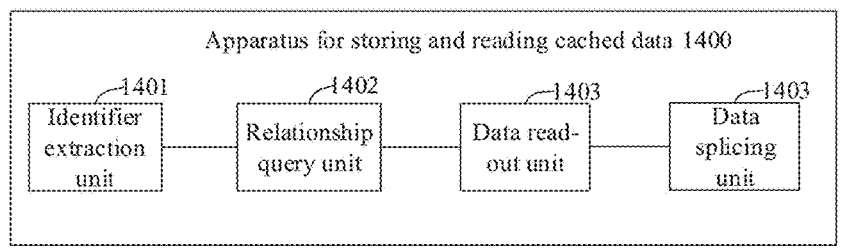
FIG. 14 is a schematic diagram of a structure of an apparatus for storing and reading cached data provided in an embodiment of the present disclosure.

FIG. 14 is a schematic diagram of a structure of an apparatus for storing and reading cached data provided in an embodiment of the present disclosure. As shown in FIG. 14, another apparatus for storing and reading cached data 1400 provided in the embodiment of the present disclosure includes an identifier extraction unit 1401, a relationship query unit 1402, a data read-out unit 1403, and a data splicing unit 1404.

The identifier extraction unit 1401 is configured to, in response to obtaining a buffered data read-out instruction, extract a second identifier from the buffered data read-out instruction, the second identifier being an identifier of to-be-output data.

The relationship query unit 1402 is configured to query a resource management table according to the second identifier to sequentially obtain addresses of at least two second storage particles associated with the to-be-output data, the second storage particles being distributed in at least two storage blocks.

The data read-out unit 1403 is configured to read out second fragmented data from the storage particles of the at least two storage blocks according to the addresses of the second storage particles in a time division multiplexing manner.

The data splicing unit 1404 is configured to splice the second fragmented data until the to-be-output data are obtained.

In some embodiments, a number of buffered data read-out instructions is at least two, and the number of the buffered data read-out instructions is less than or equal to that of the storage blocks; for the addresses of the second storage particles, the data read-out unit 1403 reads out the second fragmented data from storage addresses of the at least two storage blocks in a time division multiplexing manner according to the addresses of the second storage particles, where the storage blocks corresponding to the respective second fragmented data being read at the same time are different from each other; and the data splicing unit 1404 splices the second fragmented data corresponding to each second identifier until all the to-be-output data are obtained.

An embodiment of the present disclosure further provides a computing device. The computing device includes a processor and a memory, where the memory stores a computer program, and when the computer program is executed by the processor, the method for storing and reading cached data in any of the foregoing embodiments can be implemented.

Figure 15:
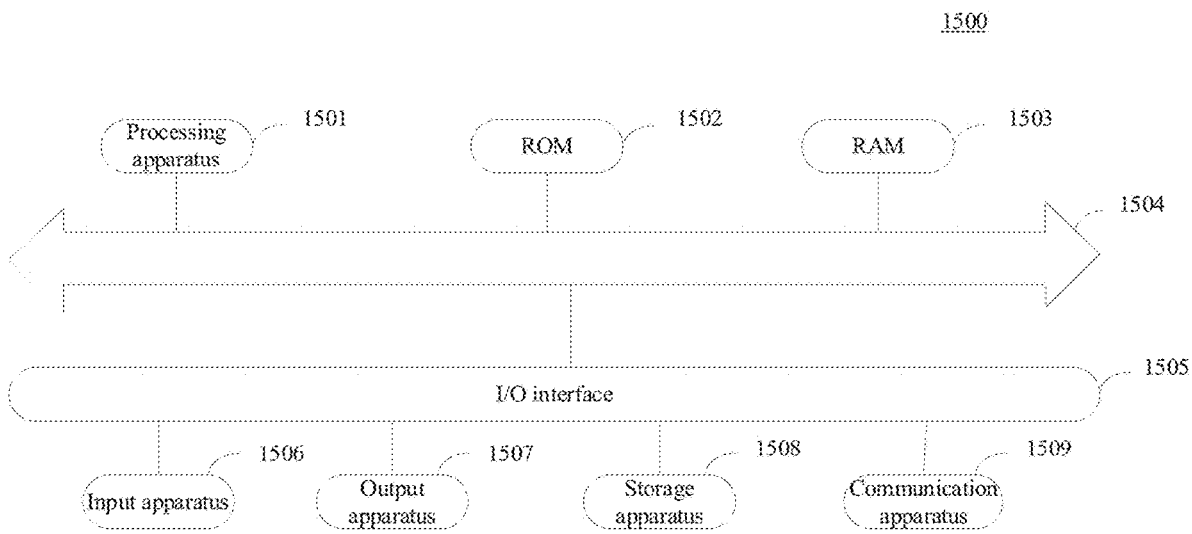
FIG. 15 is a schematic diagram of a structure of a computing device provided in an embodiment of the present disclosure.

FIG. 15 is a schematic diagram of a structure of a computing device provided in an embodiment of the present disclosure. The following is a specific reference to FIG. 15, which illustrates a schematic diagram of a structure of a computing device 1500 adapted to implement the embodiments of the present disclosure. The computing device shown in FIG. 15 is only an example and should not impose any limitation on the function and scope of use of the embodiments of the present disclosure.

As shown in FIG. 15, the computing device 1500 may include a processing apparatus (such as a central processing unit or a graphics processing unit) 1501, which may execute various appropriate operations and processes according to a program stored in a read-only memory ROM 1502 or a program loaded into a random access memory RAM 1503 from a storage apparatus 1508. In the RAM 1503, various programs and data required for the operations of the computing device 1500 are also stored. The processing apparatus 1501, the ROM 1502, and the RAM 1503 are connected to each other by a bus 1504. An input/output I/O interface 1505 is also connected to the bus 1504.

In particular, according to the embodiments of the present disclosure, the process described above with reference to the flowchart may be implemented in a computer software program. For example, an embodiment of the present disclosure provides a computer program product, including a computer program loaded to a non-transient computer-readable medium, the computer program including program code used for executing the method shown in the flowchart. In such an embodiment, the computer program may be downloaded and installed from a network via a communication apparatus 1509, or installed from the storage apparatus 1508, or installed from the ROM 1502. The computer program, when executed by the processing apparatus 1501, performs the foregoing functions defined in the method of the embodiments of the present disclosure.

It should be noted that the foregoing computer-readable medium of the present disclosure may be a computer-readable signal medium, a computer-readable storage medium, or any combination of the two. For example, the computer-readable storage medium may be, but is not limited to, an electrical, magnetic, optical, electromagnetic, infrared, or semiconductor system, apparatus, or device, or any combination of the above. A more specific example of the computer-readable storage medium may include, but is not limited to: an electrical connection with one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical memory, a magnetic memory, or any suitable combination of the above. In the present disclosure, the computer-readable storage medium can be any tangible medium containing or storing programs which can be used by an instruction execution system, apparatus or device or incorporated thereto. In the present disclosure, the computer-readable signal medium may include data signals in base bands or propagated as part of carriers, in which computer readable program code is carried. The propagated data signals may be in various forms, including but not limited to electromagnetic signals, optical signals, or any suitable combination of the above. The computer-readable signal medium may further be any computer-readable medium except the computer-readable storage medium. The computer-readable signal medium may send, propagate, or transmit a program used by an instruction execution system, apparatus, or device, or a combination thereof. The program code included in the computer-readable medium may be transmitted by any appropriate medium, including but not limited to a wire, an optical cable, radio frequency (RF), or the like, or any appropriate combination of the above.

The foregoing computer-readable medium may be included in the foregoing computing device, or may exist alone and is not assembled into the computing device.

The foregoing computer-readable medium carries one or more programs, and when the one or more programs are executed by the computing device, the computing device is enabled to: in response to receiving to-be-cached data, segment the to-be-cached data sequentially into at least two pieces of first fragmented data; write the first fragmented data sequentially into first storage particles of the at least two storage blocks in a time division multiplexing manner, and ensure that the first fragmented data written into the respective first storage particles are different from each other; and save a correspondence between first identifiers of the to-be-cached data and addresses of the first storage particles to a resource management table; and/or in response to obtaining a buffered data read-out instruction, extract a second identifier from the buffered data read-out instruction, the second identifier being an identifier of to-be-output data; query a resource management table according to the second identifier to sequentially obtain addresses of at least two second storage particles associated with the to-be-output data, the second storage particles being distributed in the at least two storage blocks; read out second fragmented data from the at least two storage blocks according to the addresses of the second storage particles in a time division multiplexing manner; and splice the second fragmented data until the to-be-output data are obtained.

Computer program code for executing operations of the present disclosure may be compiled in one or more programming languages or a combination thereof. The programming languages include, but are not limited to, object-oriented programming languages, such as Java, Smalltalk, or C++, and also include conventional procedural programming languages, such as "C" language or similar programming languages. The program code may be completely or partially executed on a tester's computer, executed as an independent software package, partially executed on a tester's computer and partially executed on a remote computer, or completely executed on a remote computer or a server. In a case involving a remote computer, the remote computer may be connected to a tester's computer through any network including a local area network (LAN) or a wide area network (WAN) or may be connected to an external computer (for example, connected through the Internet by using an Internet service provider).

The flowcharts and block diagrams in the accompanying drawings illustrate system architectures, functions, and operations that may be implemented according to the systems, methods, and computer program products of various embodiments of the present disclosure. In this regard, each of the blocks in the flowcharts or block diagrams may represent a module, a program segment, or a portion of code, and the module, the program segment, or the portion of code includes one or more executable instructions for implementing specified logic functions. It should also be noted that in some optional implementations, the functions annotated in the blocks may also occur in a different order from the order annotated in the drawings. For example, two consecutive blocks may actually be executed substantially in parallel, or they may sometimes be executed in a reverse order, which depends on the involved functions. It should also be noted that each block in the block diagrams and/or flowcharts, and a combination of the blocks in the block diagrams and/or flowcharts, may be implemented by a dedicated hardware-based system that performs the specified functions or operations, or may be implemented by a combination of dedicated hardware and computer instructions.

The units described in the embodiments of the present disclosure may be implemented by software or hardware. The names of the units do not define the units themselves in a case.

The functions described above may be executed at least in part by one or more hardware logic components. For example, non-restrictively, exemplary types of hardware logic components that may be used include: a field programmable gate array (FPGA), an application specific integrated circuit (ASIC), an application specific standard product (ASSP), a system on chip (SOC), a complex programmable logic device (CPLD), and the like.

In the context of the present disclosure, the machine-readable medium may be a tangible medium, which may contain or store a program for use by an instruction execution system, apparatus, or device, or for use in combination with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the above. A more specific example of the machine-readable storage medium may include an electrical connection based on one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the above.

An embodiment of the present disclosure further provides a computer-readable storage medium. A computer program is stored in the storage medium. When the computer program is executed by a processor, the method in any of the foregoing method embodiments may be implemented. The execution manner and beneficial effects are similar, and will not be repeated here.

It should be noted that the relational terms herein, such as "first" and "second", are merely used for distinguishing one entity or operation from another, and do not necessarily require or imply that any actual relationship or sequence exists between these entities or operations. Moreover, the terms "include", "comprise", and any variants thereof are intended to cover a non-exclusive inclusion, so that a process, method, item, or device including a series of elements not only includes those elements, but further includes other elements not listed explicitly, or includes inherent elements of the process, method, item, or device. In the absence of more limitations, an element limited by "include a . . . " does not exclude other same elements existing in the process, method, item, or device including the element.

The above are merely specific implementations of the present disclosure, which enable those skilled in the art to understand or implement the present disclosure. Various modifications to these embodiments are obvious to those skilled in the art, and the general principles defined herein may be implemented in other embodiments without departing from the spirit or scope of the present disclosure. Therefore, the present disclosure will not be limited to the embodiments described herein, but will conform to the widest scope consistent with the principles and novel features disclosed herein.

What is claimed is:

1. A method for storing and reading cached data, applied to a computing device, wherein the computing device comprises a buffer storage area, the buffer storage area comprises at least two storage blocks, and each of the storage blocks has an independent address bus and data bus and a plurality of storage particles; and the method comprises:
   in response to receiving to-be-cached data, segmenting the to-be-cached data sequentially into at least two pieces of first fragmented data;
   writing the first fragmented data sequentially into respective first storage particles of the at least two storage blocks in a time division multiplexing manner, and ensuring that the first fragmented data written into the respective first storage particles are different from each other; and saving a correspondence between first identifiers of the to-be-cached data and addresses of the first storage particles to a resource management table.

2. The method according to claim 1, wherein the to-be-cached data is provided as a plurality of groups, and a number of the groups of the to-be-cached data is less than or equal to a number of the storage blocks;
  the segmenting the to-be-cached data sequentially into at least two pieces of first fragmented data comprises:
    segmenting each group of the to-be-cached data sequentially into at least two pieces of first fragmented data; and
  the writing the first fragmented data sequentially into respective first storage particles of the at least two storage blocks in a time division multiplexing manner comprises:
    writing the first fragmented data corresponding to each group of the to-be-cached data simultaneously into the respective first storage particles of the at least two storage blocks in a time division multiplexing manner, wherein the storage blocks corresponding to the respective first fragmented data being written at the same time are different from each other.

3. The method according to claim 2, wherein the writing the first fragmented data corresponding to each group of the to-be-cached data simultaneously into the respective first storage particles of the at least two storage blocks in a time division multiplexing manner comprises:
  writing the first fragmented data corresponding to each group of the to-be-cached data simultaneously in a round robin fashion into the respective first storage particles of the at least two storage blocks in a time division multiplexing manner, until all the first fragmented data are written into the buffer storage area.

4. The method according to claim 1, wherein a storage capacity of storage particles in each storage block is the same; and
  the segmenting the to-be-cached data sequentially into at least two pieces of first fragmented data comprises:
    segmenting the to-be-cached data sequentially into the at least two pieces of first fragmented data according to the storage capacity of storage particles.

5. The method according to claim 1, the method further comprises:
  in response to obtaining a buffered data read-out instruction, extracting a second identifier from the buffered data read-out instruction, the second identifier being an identifier of to-be-output data, wherein a sum of groups of the to-be-output data and the to-be-buffered data is less than or equal to the number of the storage blocks;
  querying the resource management table according to the second identifier to sequentially obtain addresses of at least two second storage particles associated with the to-be-output data, the second storage particles being distributed in the at least two storage blocks; and
  when writing the first fragmented data sequentially into respective first storage particles of the at least two storage blocks in a time division multiplexing manner, the method further comprises:
    reading out second fragmented data from the at least two storage blocks according to the addresses of the second storage particles in a time division multiplexing manner, wherein the storage block corresponding to each first fragmented data being written and the storage block corresponding to each second fragmented data being read out at the same time are different from each other; and
    splicing the second fragmented data that are read out until the to-be-output data are obtained.

6. A method for storing and reading cached data, applied to a computing device, wherein the computing device comprises a buffer storage area, the buffer storage area comprises at least two storage blocks, each of the storage blocks has a plurality of storage particles and an independent system bus; and the method comprises:
  in response to obtaining a buffered data read-out instruction, extracting a second identifier from the buffered data read-out instruction, the second identifier being an identifier of to-be-output data;
  querying a resource management table according to the second identifier to sequentially obtain addresses of at least two second storage particles associated with the to-be-output data, the second storage particles being distributed in the at least two storage blocks;
  reading out second fragmented data from the storage particles of the at least two storage blocks according to the addresses of the second storage particles in a time division multiplexing manner; and
  splicing the second fragmented data until the to-be-output data are obtained.

7. The method according to claim 6, wherein a number of data buffer read-out instructions is at least two, and the number of the buffered data read-out instructions is less than or equal to a number of the storage blocks.

8. The method according to claim 6, wherein the extracting a second identifier from the buffered data read-out instruction comprises: extracting a second identifier from each of the buffered data read-out instructions.

9. The method according to claim 6, wherein the reading out second fragmented data from the storage particles of the at least two storage blocks according to the addresses of the second storage particles in a time division multiplexing manner comprises:
  for the addresses of the second storage particles, reading out the second fragmented data from storage addresses of the at least two storage blocks in a time division multiplexing manner according to the addresses of the second storage particles, wherein the storage blocks corresponding to the respective second fragmented data being read at the same time are different from each other.

10. The method according to claim 6, wherein the splicing the second fragmented data until the to-be-output data are obtained comprises: splicing the second fragmented data corresponding to each second identifier respectively until all the to-be-output data are obtained.

11. A computing device, comprising a processor, a volatile memory, and a non-volatile memory, wherein the volatile memory comprises at least two storage blocks, each of the storage blocks has an independent system bus and a plurality of storage particles, and the non-volatile memory is used for storing a computer program; when the computer program is loaded by the processor, the processor is enabled to execute a method for storing and reading cached data, wherein the method is applied to a computing device, the computing device comprises a buffer storage area, the buffer storage area comprises at least two storage blocks, and each of the storage blocks has an independent address bus and data bus and a plurality of storage particles; and the method comprises:
  in response to receiving to-be-cached data, segmenting the to-be-cached data sequentially into at least two pieces of first fragmented data;
  writing the first fragmented data sequentially into respective first storage particles of the at least two storage blocks in a time division multiplexing manner, and ensuring that the first fragmented data written into the respective first storage particles are different from each other; and saving a correspondence between first identifiers of the to-be-cached data and addresses of the first storage particles to a resource management table.

12. The computing device according to claim 11, wherein the to-be-cached data is provided as a plurality of groups, and the number of the groups of the to-be-cached data is less than or equal to a number of the storage blocks;
   the segmenting the to-be-cached data sequentially into at least two pieces of first fragmented data comprises: segmenting each group of the to-be-cached data sequentially into at least two pieces of first fragmented data; and
   the writing the first fragmented data sequentially into respective first storage particles of the at least two storage blocks in a time division multiplexing manner comprises:
   writing the first fragmented data corresponding to each group of the to-be-cached data simultaneously into the respective first storage particles of the at least two storage blocks in a time division multiplexing manner, wherein the storage blocks corresponding to the respective first fragmented data being written at the same time are different from each other.

13. The computing device according to claim 12, wherein the writing the first fragmented data corresponding to each group of the to-be-cached data simultaneously into the respective first storage particles of the at least two storage blocks in a time division multiplexing manner comprises:
   writing the first fragmented data corresponding to each group of the to-be-cached data simultaneously in a round robin fashion into the first storage particles of the at least two storage blocks in a time division multiplexing manner, until all the first fragmented data are written into the buffer storage area.

14. The computing device according to claim 11, wherein a storage capacity of storage particles in each storage block is the same; and
   the segmenting the to-be-cached data sequentially into at least two pieces of first fragmented data comprises: segmenting the to-be-cached data sequentially into the at least two pieces of first fragmented data according to the storage capacity of storage particles.

15. The computing device according to claim 11, the method further comprises:
   in response to obtaining a buffered data read-out instruction, extracting a second identifier from the buffered data read-out instruction, the second identifier being an identifier of to-be-output data, wherein a sum of groups of the to-be-output data and the to-be-buffered data is less than or equal to the number of the storage blocks;
   querying a resource management table according to the second identifier to sequentially obtain addresses of at least two second storage particles associated with the to-be-output data, the second storage particles being distributed in the at least two storage blocks;
   when writing the first fragmented data sequentially into respective first storage particles of the at least two storage blocks in a time division multiplexing manner, the method further comprises:
   reading out second fragmented data from the at least two storage blocks according to the addresses of the second storage particles in a time division multiplexing manner, wherein the storage block corresponding to each first fragmented data being written and the storage block corresponding to each second fragmented data being read out at the same time are different from each other; and splicing the second fragmented data that are read out until the to-be-output data are obtained.

* * * * *